Patented Feb. 4, 1947

2,415,239

UNITED STATES PATENT OFFICE 2,415,239

PROCESS FOR MAKING CHEESE

Alan E. Flowers and Andrew E. Merget, Poughkeepsie, N. Y., assignors to The De Laval Separator Company, New York, N. Y., a corporation of New Jersey No Drawing. Application May 20, 1944, Serial No. 536,608

4 Claims. (Cl. 99—116)

In the manufacture of various kinds of cheese, it is customary to take curdled milk or its equivalent, and by a long established conventional procedure, including a prolonged period of drainage, separate the whey or serum, leaving a product composed mainly of butterfat and milk solids. One of the serious objections to the conventional method of cheese manufacture is that the prolonged time required for the separation of the whey or serum effects physical or chemical changes, or both, that deleteriously affect the flavor, and particularly the keeping qualities, of the cheese.

A primary object of our invention is to produce cheese of superior flavor whose keeping qualities are greatly superior to cheese produced by conventional methods. We have found that if the separation of whey or serum is effected promptly and rapidly after homogenization, the cheese will suffer no deterioration even if kept in storage for a period of time long exceeding that which would normally elapse between the date of manufacture of the marketable product and the dates of its sale and consumption.

In the normal process of making cheese, the solids have a tendency to rise to the top of the vat in which it is curdled while the whey has a tendency to settle toward the bottom. However, the force of gravity is too weak to cause effective separation.

If attempts are made to separate these constituents by centrifugal force, especially if, as hereinafter explained, cream is added to the milk before centrifugation, the whey moves toward the larger diameter portion of the bowl and the curds, which after separation are to be further processed to make cheese, move toward the center where, because of a tendency to pack, it is difficult to force out of the bowl. The fact that it has to be moved against centrifugal force aggravates this condition.

We have discovered that the curd itself is substantially heavier than the serum and that the tendency for it to float is due to minute bubbles of gas generated during the curdling process and either clinging to the surface of curd particles or trapped in the interstices of clusters of such particles. We have found that, if these gas bubbles are removed, the curd will be enough heavier than the serum to make centrifugal separation relatively easy, with the curd the heavy constituent which moves to the largest diameter portion of the bowl, whence it can be discharged through one of several types of outlets therefrom. Centrifuges having constantly open radial or tangential orifices are well known in the art and are suitable for practicing this step of the process. Another efficient centrifuge is one having constantly open radially inward flow passages, as disclosed in U. S. Patent No. 1,935,117, issued November 14, 1933, to O. E. Froeding. Another efficient centrifuge is one having intermittently openable valved orifices as disclosed in U. S. Patent No. 2,022,841, issued December 3, 1935, to George J. Strezynski. Because centrifugal force acts in the direction of movement toward the outlets from the centrifugal bowl it assists, instead of resisting, the flow toward them. The whey, which is quite fluid, is displaced inward toward the central outlet of the bowl, whence it is easily discharged.

The gas bubbles may be mechanically disengaged from the curd particles by stirring or whipping, the severity of which will depend on the condition of the material being treated; or the gas may be removed by subjecting shallow layers thereof to a high vacuum whereby the bubbles of gas are caused to expand until they break free from the solid particles and rise to and escape from the surface of the mixture; or, in cases where the engagement of the gases by the solids is particularly strong, the gas may be removed by a combination of mechanical disengagement and increased buoyancy due to expansion at low absolute pressure.

Containers with stirrers or whippers are well known in the art. Two types of apparatus for vacuum removal of gases from liquids are disclosed in U. S. Patent No. 1,529,884 issued March 17, 1925, to Selden H. Hall.

In the manufacture of most grades of cheese, a certain percentage of butterfat, in the form of cream, varying up to ten per cent is added to the milk before or after curdling. This addition still further reduces the specific gravity of the curd, and consequently, to insure giving to the curd the required higher specific gravity, the removal of gas must be more nearly complete the higher the percentage of added cream. If the cream should be added to the curd after its centrifugal separation from the whey, the curd, in some instances, even though having more or less gas entrained therein, may be of slightly higher specific gravity than the whey, thereby making it possible to separate the curd from the whey without prior degasification. However, even in such cases, partial, or even nearly complete, degasification is of great advantage, since the greater the difference between the specific gravities of the constituents of the mixture undergoing centrifugation, the cleaner will be the separation.

What we claim and desire to protect by Letters Patent is:

1. In the manufacture of cheese from a curdled mixture of gas-containing curd and whey wherein the gas is so entrained with the curd as to substantially reduce its specific gravity relative to that of the whey, the process which comprises removing from the mixture gas entrained therewith to the degree required to increase the specific gravity of the curd substantially above that of the whey, separating by centrifugal force the curd as the substantially heavier constituent from the whey as the substantially lighter constituent, the curd thereby moving to the outer zone of the locus of centrifugation where the maximum force becomes available for its complete separation from the whey and for its movement through and out of the locus of centrifugal force, and separately removing the separated constituents while said force is operative.

2. In the manufacture of cheese from a curdled mixture of gas-containing curd and whey wherein the gas is so entrained with the curd as to reduce its specific gravity relative to that of the whey, that process which comprises removing from the mixture gas entrained therewith to the degree required to increase the specific gravity of the curd to substantially above that of the whey, and then continuously conveying the degassed mixture to a locus of centrifugal force and there by centrifugal force continuously separating the lighter whey from the heavier curd and while the centrifugal force is operative continuously discharging the separated whey and curd.

3. In the manufacture of cheese from a curdled mixture of gas-containing curd and whey wherein the gas is so entrained with the curd as to reduce its specific gravity relative to that of the whey, that process which comprises increasing the specific gravity of the curd to substantially more than that of the whey by removing gas therefrom, and then continuously conveying the mixture of whey and degassed curd to a locus of centrifugal force and there by centrifugal force continuously separating the whey from the heavier curd and while the centrifugal force is operative continuously separately discharging the curd and the whey.

4. In the manufacture of cheese from a curdled mixture of gas-containing curd and whey wherein the gas is so entrained with the curd that the specific gravity of the curd is reduced relative to that of the whey, that process which comprises subjecting said mixture to a vacuum sufficiently high to remove from the mixture entrained gas and increase the specific gravity of the curd to substantially above that of the whey, continuously conveying the mixture of whey and degassed curd to a locus of centrifugal force and there continuously separating and continuously separately discharging the curd and the whey.

ALAN E. FLOWERS.
ANDREW E. MERGET.

REFERENCES CITED

The following references are of record in the file of this patent:

UNITED STATES PATENTS

| Number | Name | Date |
|---|---|---|
| 567,522 | Turner | Sept. 8, 1896 |
| 526,165 | Salenius | Sept. 18, 1894 |
| 2,209,694 | Harford | July 30, 1940 |

FOREIGN PATENTS

| Number | Country | Date |
|---|---|---|
| 2,445 | British | June 23, 1877 |
| 4,869 | British | Dec. 22, 1877 |
| 165,398 | British | May 18, 1922 |